United States Patent
Jamadar et al.

(10) Patent No.: US 12,358,176 B2
(45) Date of Patent: Jul. 15, 2025

(54) METHOD AND DEVICE FOR CUTTING ELECTRODE FOILS

(71) Applicant: VOLKSWAGEN AKTIENGESELLSCHAFT, Wolfsburg (DE)

(72) Inventors: Kartik Jamadar, Wolfsburg (DE); Priyanka Gangurde, Nashik (IN)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 331 days.

(21) Appl. No.: 17/865,689

(22) Filed: Jul. 15, 2022

(65) Prior Publication Data

US 2023/0014235 A1 Jan. 19, 2023

(30) Foreign Application Priority Data

Jul. 16, 2021 (DE) .................. 10 2021 118 459.2

(51) Int. Cl.
*B26F 3/00* (2006.01)
*H01M 4/04* (2006.01)

(52) U.S. Cl.
CPC .............. *B26F 3/004* (2013.01); *H01M 4/04* (2013.01)

(58) Field of Classification Search
CPC ......... B24C 1/045; B24C 5/005; B24C 3/322; B24C 3/088; B26F 3/004; B26D 7/086
USPC ................................. 451/165, 910
See application file for complete search history.

(56) References Cited

U.S. PATENT DOCUMENTS

| 2,774,194 | A | * | 12/1956 | Thatcher | B28D 5/047 |
| | | | | | 451/37 |
| 3,241,265 | A | * | 3/1966 | Wing | B24C 1/045 |
| | | | | | 451/78 |
| 2004/0235395 | A1 | | 4/2004 | Hashish et al. | |
| 2012/0252326 | A1 | | 10/2012 | Schubert et al. | |

FOREIGN PATENT DOCUMENTS

| DE | 10 2017 218 137 A1 | | 4/2019 | | |
| DE | 102019200419 A1 | * | 7/2020 | | |
| FR | 3061055 A1 | * | 6/2018 | ............... | B24C 1/08 |
| JP | H06143099 A | * | 5/1994 | | |
| JP | 5177647 B2 | | 4/2013 | | |
| JP | 2015-146237 A | | 8/2015 | | |
| WO | WO-2014200393 A1 | * | 12/2014 | ........... | B29C 70/342 |

OTHER PUBLICATIONS

Search Report for European Patent Application No. 22183250, dated Nov. 11, 2022.

* cited by examiner

*Primary Examiner* — Jennifer S Matthews
(74) *Attorney, Agent, or Firm* — PEARL COHEN ZEDEK LATZER BARATZ LLP

(57) ABSTRACT

A method for cutting electrode foils and a device for cutting electrode foils that are intended for use in a battery cell are proposed. The cutting device comprises a cutting tool, a vibration device for exciting at least the cutting tool to vibration, and a particle feed line for feeding at least particles. The cutting tool can be arranged above the electrode foil with a separation from a surface of the electrode foil, and the electrode foil can be cut at least as a result of the vibrations of the cutting tool that are transmitted to at least one particle.

13 Claims, 5 Drawing Sheets

METHOD AND DEVICE FOR CUTTING ELECTRODE FOILS

CROSS REFERENCE TO RELATED APPLICATION

This application claims priority from German Patent Application No. 10 2021 118 459.2, field Jul. 16, 2021, which is hereby incorporated by reference in its entirety.

FIELD OF THE INVENTION

The invention relates to a method and device for cutting electrode foils, particularly coated electrode foils.

BACKGROUND OF THE INVENTION

Batteries, and particularly lithium-ion batteries, are increasingly being used to drive motor vehicles. Batteries are typically assembled from cells, with each cell having a stack of anode, cathode, and separator foils, possibly in the form of strata or material layers. At least some anode and cathode foils are embodied as electrical current collectors for diverting the current provided by the cell to a consumer arranged outside the cell. The individual elements of a stack will also be referred to hereinafter as electrodes or foils.

The individual foils are provided particularly as a continuous material, are optionally coated, e.g., with an active material, and are at least partially trimmed. Uncoated regions of coated foils can be used as collectors.

When cutting electrodes, the following cuts are performed:
  Slitting: The cutting line extends along the extension (x direction) of the continuous material so as to divide the wide starting material into a plurality of narrower strips of continuous material;
  Notching: The collectors are formed from the continuous material with the cutting line; the cutting lines extend longitudinally and transversely to the extension of the continuous material;
  Cutting: The cutting line is transverse to the extension of the continuous material; as a result of the cutting, the electrode foils are cut off from the continuous material and the individual layers of the stack are formed.

The current state of the art in cutting lithium-ion battery electrodes utilizes the shearing principle, according to which an upper blade (above a layer to be cut) comes into contact with a lower blade (below a layer to be cut). The contact leads to high friction and thus to faster tool wear. Slitting at high speeds exacerbates this problem. For this reason, the cutting speed is currently limited to a maximum of 120 m/min [meters/minute].

Slitting is performed particularly by upper and lower tungsten carbide circular blades. These blades need to be resharpened after approximately 200 km [kilometers] of cutting line. Such frequent regrinding of the blades results in high operating costs.

Notching and cutting are performed particularly as separate operations after slitting. This is done either mechanically or by laser. The use of separate machines for slitting and notching entails greater investment and space requirements.

Laser cutting is an energy-intensive process (~6 kW [kilowatt] power requirement of the system) and creates a heat-affected zone. The active material of the coated electrode in the heat-affected zone is burned, reducing the battery capacity. The laser process is also inefficient, because most of the concentrated light rays are reflected off the copper or aluminum surface of the electrode. In particular, a special green laser is needed in order to achieve better light absorption. However, this type of laser is expensive and does not allow speeds of greater than 80 m/min.

Mechanical notching results in high tool wear. In addition, the advancement of the electrodes must be stopped at regular intervals in order to carry out the method step. This results in reduced cutting speeds. The movement of the electrode in the z direction (thickness direction) during the slitting process causes ripple to occur at the slit edge or cutting line. It is not possible to control this ripple because there is no counter tool.

In particular, there is no provision for limiting the movement of the electrodes in the y direction (width direction). This results in ripple in the y direction.

Due to the lack of a counterforce when slitting and mechanically notching, burrs can form. In particular, this can result in a short circuit in the battery cell. Active material of the cut electrode can get caught on the cutting edges. This requires extensive cleaning of the cutting edge as well as of the blade. Adhesion of particles larger than 10 μm [microns] to the cutting edges can also cause a short circuit in the battery cell.

In short, cutting with the tool (mechanical cutting) and/or cutting with energy (laser) can result in reduced cutting speed, increased cost, reduced battery capacity, and/or reduced battery cell safety.

These drawbacks could be mitigated as follows:
  Extensive cleaning of the cut edge when cutting with a solution of alcohol and paraffin oil;
  Cleaning the cutting edge during mechanical cutting by means of contact and contactless cleaning; in contactless cleaning, ionized air is blown onto the cutting edge in order to neutralize static on non-conductive particles; such neutralized particles can then be blown off or suctioned off;
  Use of a green laser, because it has the lowest reflection from the metallic surface of the electrode;
  Reducing the cutting speed so that tool wear can be reduced;
  Softening of the tolerance of the cutting edge (in terms of allowable burr size and particle adhesion), but that reduces battery safety.

The primary drawbacks of known systems that are in use are as follows:
  High wear of the slitting blade; it must be reground every 200 km; tungsten carbide and other hard metals and ceramics as tool material reduce this wear rate but are very expensive;
  An extensive cleaning station is required when cutting; an electrode cleaning station may be required after slitting and laser cutting in order to remove particulate contamination from the electrode; this increases the cost, cycle time, and/or space requirements of the machine;
  Mechanical longitudinal cutting (slitting) is very sensitive to cutting parameters such as cutting angle, cutting speed, force between upper and lower blade, blade surface roughness, and machine vibration; minor changes lead to burr formation and additional particle contamination;
  There is currently no viable solution for continuous notching and cutting; this means that the movement of the electrode is temporarily halted during notching and cutting; this reduces the speed of notching and cutting; the maximum speed for notching and cutting is 60 m/min.

The following techniques are known to overcome some of the drawbacks mentioned:

- Using hard material such as high chromium steel, ceramics, and tungsten carbide as tool material in order to reduce wear;
- The smallest radius when notching is set to 2 mm [millimeters]; it is not possible to achieve a smaller radius between two cutting edges (at the intersection of longitudinal and cross section);
- Continuous movement of the electrode during notching and cutting can only be carried out by a few manufacturing specialists; this means that the laser gun travels at an angle while cutting so that the final trimming cut is "perfectly" straight; this requires very precise control of the travel path of the laser gun and electrode;
- Use of various cutting principles such as rotary cutting for slitting and notching; with rotary cutting, the quality of the cross section is inferior to that achieved with longitudinal cutting;
- Using a high-powered (6 kW) green laser to cut the anode;
- When laser-cutting the electrode, a cooling plate is used in order to achieve rapid cooling and reduce the heat-affected zone.

As a result, cutting the battery electrode with mechanical tools or with energy (laser) is still an error-prone, tolerance-heavy, expensive, and/or unreliable process.

A method for manufacturing an electrode arrangement is known from DE 10 2017 218 137 A1. There, an electrode material is cut by means of ultrasonic cutting, i.e., using a vibrating cutting edge. The cutting edge contacts the electrode material.

It is the object of the present invention to at least partially solve the problems described herein with reference to the prior art. In particular, a method and device for cutting electrode foils are to be proposed with which a high-quality cut can be achieved at high speed and with as little wear as possible.

A method and a cutting device with the features with the features of the independent claims contribute to the achievement of these objects. Advantageous developments are the subject of the dependent claims. The features listed individually in the claims can be combined in a technologically meaningful manner and supplemented by explanatory facts from the description and/or details of the figures, with additional design variants of the invention being indicated.

What is proposed is a method for cutting electrode foils. The electrode foils are intended for use in a battery cell. The method is carried out with at least one cutting device. The cutting device comprises at least one cutting tool, one vibration device, and one particle feed line.

The method comprises at least the following steps:
a) Providing an electrode foil with a surface;
b) Arranging the cutting tool over the electrode foil with separation from the surface;
c) Introducing at least particles from the particle feed line into the cutting device;
d) Exciting the cutting tool to vibration by means of the vibration device;
e) Applying the vibrations of the cutting tool to the electrode foil via at least one particle that is interposed between the cutting tool and the electrode foil, whereby the electrode foil is cut.

The above (non-exhaustive) breakdown of the method steps into a) through e) is primarily intended to serve purposes of distinction and not to impose any order and/or dependency. The frequency of the method steps can also vary. It is also possible for method steps to overlap temporally at least in part. Steps c) to e) very especially preferably take place at least partially in parallel to one another. Steps c) to e) take place particularly after steps a) and b).

A battery cell comprises, in particular, a housing which encloses a volume and, arranged in the volume, at least one first electrode foil of a first electrode type, one second electrode foil of a second electrode type, and one separator material interposed therebetween, as well as an electrolyte, e.g., a liquid or a solid electrolyte.

The battery cell is particularly a pouch cell (with a deformable housing consisting of a pouch film) or a prismatic cell (with a dimensionally stable housing). A pouch film is a well-known deformable housing part that is used as a housing for so-called pouch cells. It is a composite material comprising a plastic and aluminum, for example.

The battery cell is particularly a lithium-ion battery cell.

The individual foils of the plurality of electrode foils are arranged one on top of the other and particularly form a stack. The electrode foils are each associated with different electrode types, i.e., they are embodied as an anode or a cathode. Anodes and cathodes are arranged alternately and are respectively separated from one another by the separator material.

A battery cell is a power storage means that is used in a motor vehicle, for example, to store electric power. A motor vehicle, for example, has in particular an electric machine for driving the motor vehicle (a traction drive), it being possible for the electric machine to be driven by the electric power stored in the battery cell.

According to step a), an electrode foil with a surface is particularly provided. The electrode foil is provided particularly as a continuous material. In particular, the electrode foil comprises a carrier material which is particularly composed of a metallic material that is optionally and at least partially coated, e.g., with an active material. The electrode foil has two largest side surfaces with a theoretically continuous length in an x direction, a width in a y direction, and a thickness in a z direction. The extension in the z direction is the smallest. In the present case, one of the side faces of the electrode foil forms the surface.

A cutting device is provided which comprises at least one cutting tool, one vibration device, and one particle feed line. Furthermore, the cutting tool is arranged over the electrode foil with separation from the surface (step b)).

The cutting tool is excited to vibration by the vibration device. In particular, the cutting tool does not contact the surface, or does not do so directly. In particular, the cutting tool contacts the surface via at least one particle that is interposed between the cutting tool and the surface. The cutting tool thus particularly contacts the particle and moves the particle as a result of the vibrations. The particle which has been excited in this manner produces the cutting effect on the electrode foil. The separation between the cutting tool and the surface can thus be bridged particularly by individual particles.

A particle feed line is also provided. According to step c), at least particles are particularly introduced from the particle feed line into the cutting device. This feed line is used particularly to transport the particles to the cutting device, more particularly to the cutting tool, more particularly to the surface of the electrode foil that is situated opposite the cutting tool.

According to step d), at least the cutting tool is particularly excited by the vibration device. As a result of the vibrations, at least the cutting tool moves particularly on a plane that is oriented perpendicular to the surface. In particular, this also stimulates the feeding of particles, more particularly an outlet of the particle feed line or of a feeding device. The particle feed line or the feeding device can be coupled—i.e., connected—to the cutting tool for this purpose. At least the particles can be transferred via the particle feed line to a feeding device that is coupled to the cutting tool.

According to step e), the vibrations of the cutting tool are particularly applied to the electrode foil via at least one particle that is interposed between the cutting tool and the electrode foil, whereby the electrode foil is cut. In particular, the electrode foil is not cut by the impact of the particles on the surface.

In particular, the cutting tool is arranged on an ultrasonic horn, which is excited to vibration by the vibration device. In particular, the cutting tool and the ultrasonic horn are connected to one another by a slide mechanism. The slide mechanism enables the cutting tool to be exchanged with particular ease. To do this, the cutting tool is pushed into a receptacle on the ultrasonic horn. As a result of the vibrations, the cutting tool moves particularly on a plane that is oriented perpendicular to the surface.

An ultrasonic horn is a tool that is caused to undergo resonance vibrations through the introduction of high-frequency mechanical vibrations (e.g., ultrasound, but also lower frequencies). An amplitude of the excitation can be increased via the ultrasonic horn.

Instead of slitting and notching with mechanical cutting (using the principle of shearing by the cutting tool) or by energy (laser), the cutting is performed here by means of a vibrating cutting tool. The cutting effect of the particles or, rather, of the cutting tool can be enhanced through the high-frequency excitation of the particle stream or of the cutting tool by means of the ultrasonic horn. In particular, the cutting tool does not contact the surface directly, but rather only indirectly via at least one particle.

With the proposed method, it is particularly possible to achieve high cutting speeds. In addition, there is tool wear only on the cutting tool. Furthermore, there are no burrs on the cut edges, nor is there a heat-affected zone. The method is particularly suitable for slitting. However, it can also be used for notching and cutting.

Here, the cutting is carried out using only one operating principle: the hammer effect of a "hammering" process. In particular, cutting does not occur through the operating principle of a throwing mechanism (bombardment).

In the operating principle of the throwing mechanism, which is not employed here, a possibly vibrating gas stream, particularly a high-velocity air jet, carries the abrasively acting particles along with it. In particular, the particles also begin to vibrate in the gas stream. Both the gas stream and the particles are hurled against the cutting region of the surface in the form of a sharp, abrasive gas blade. The cutting occurs particularly through the kinetic and possibly vibrational energy of the particles that are transported by the first gas stream.

With the operating principle used here—i.e., the hammering process—cutting is carried out by means of vibrational excitation and abrasively acting particles. An abrasive is distributed over the cutting region (here, the surface) and set in motion by a vibrating cutting tool. There is thus an interaction here between the cutting tool and the electrode foil. The cutting occurs here particularly as a result of the vibrational energy of the cutting tool and through the abrasive effect of the particles that are interposed between the cutting tool and the surface and moved by the cutting tool. The particles can be transported toward the cutting tool and the surface alone or as a mixture, e.g., together with a liquid.

In particular, an outlet of the particle feed line or of the feeding device is coupled to the cutting tool. In particular, the vibrations of the vibration device can be transmitted via the cutting tool to the outlet and/or particle feed line or feeding device.

In particular, the cutting device also has an enclosure which is arranged on the surface before step c). In step c), at least the particles are introduced into the enclosure. In particular, the enclosure ensures that the particles that are fed in remain in the vicinity of the cutting tool. The region around the cutting tool defined by the enclosure is particularly designed to be as small as possible, so that the quantity of particles supplied can be limited. In particular, the enclosure is arranged at a distance from the cutting tool, so that the vibrations of the cutting tool are not limited or dampened by the enclosure.

In particular, at least one end face of the enclosure that contacts the surface is designed to be elastically deformable. In particular, the enclosure can be arranged on the surface, and a gap between the end face and the surface can be sealed.

In particular, at least
 the vibration has an amplitude, particularly at a tip of the cutting tool, of at most 80 microns, preferably at most 60 microns or at most 50 microns; preferably at least 10 microns or at least 15 microns; or
 the vibration has a frequency between 5 kHz [kilohertz] and 50 kHz, preferably between 10 kHz and 25 kHz.

When the cutting tool vibrates relative to the electrode foil, the particles act as penetrators and penetrate the material of the electrode foil. During the proposed ultrasonic processing, material is removed particularly as a result of the formation and propagation of cracks and brittle fracturing of the material.

The vibration device preferably comprises a transducer (piezoelectric or magnetostrictive) to which a high-frequency electrical signal is transmitted. The transducer converts the electrical signal into low-frequency mechanical vibrations with a low amplitude. Essentially, the transducer converts electric power into mechanical vibrations. This mechanical vibration is then passed on to the cutting tool or ultrasonic horn.

The mechanical vibrations in the vicinity of the transducer have a low amplitude. The primary function of the ultrasonic horn is to amplify this vibration.

A piezoelectric transducer, or crystal, produces a small electric current when it is compressed. When electric current is passed through the crystal, it expands. When the current is removed, the crystal returns to its original size and shape. Such transducers are available up to 900 watts. Piezoelectric crystals have a high conversion efficiency of 95%. During the use of such a transducer, an electrical signal is introduced into the transducer, and the mechanical vibration generated in this manner is passed on to the ultrasonic horn.

A magnetostrictive transducer changes in length when exposed to a strong magnetic field. These transducers are made from nickel or nickel alloy sheets. Their conversion efficiency is around 20-30%. Such transducers are available up to 2000 watts. The maximum change in length that can be achieved is around 25 micrometers. During the use of such a transducer, a magnetic field is fed into the transducer, and the mechanical vibration generated in this manner is then delivered to the ultrasonic horn.

The piezoelectric transducer is preferable because of its high conversion efficiency. A low frequency of between 10 kHz and 20 kHz and an amplitude of around 50 microns has proven to be especially suitable for cutting electrode foils.

The ultrasonic horn receives an input amplitude of about 10 to 25 microns, and the output amplitude at the output is then amplified to 50 microns.

The transducer is provided particularly in the form of a ring and is arranged in the vicinity of a first end of the cutting tool or ultrasonic horn. In particular, only the ultrasonic horn is excited via the transducer. The transducer can also be provided in the form of a cylinder that is connected to the first end of the cutting tool or ultrasonic horn.

The cutting tool or the ultrasonic horn extends between a first end and a second end. The vibrations are initiated at the first end. The tip of the cutting tool is arranged at the second end. If the cutting tool is arranged on an ultrasonic horn, the first end of the ultrasonic horn is considered to be the first end of the cutting tool.

The ultrasonic horn is particularly made of titanium or a titanium alloy, e.g., $Ti_6Al_4V$.

The cutting tool is particularly made of tungsten carbide.

The calculation of the required length of an ultrasonic horn, i.e., between the first end and the second end of the cutting tool, is one of the most important aspects of ultrasonic horn design. In order to minimize losses and transfer the maximum energy from the ultrasonic converter or transducer to the ultrasonic horn, the ultrasonic horn should be in resonance with the operating frequency of the transducer. The length of the ultrasonic horn, particularly up to the tip of the cutting tool, should be an odd multiple of half the wavelength of the transducer vibration (lambda/2). In particular, it should be noted that the amplitude of the vibration is at its maximum at the second end. The node is provided particularly at the first end of the ultrasonic horn, and the antinode is provided at the second end or at the tip of the cutting tool.

In particular, the cutting tool has a tip facing toward the electrode foil with a smallest width of 0.2 to 1.5 millimeters. The smallest width is particularly the smallest extension of the width. If the ultrasonic horn is rectangular, for instance, the tip extends parallel to the surface of the electrode foil along a length. This much greater length must not be understood as the width.

In particular, a mixture of at least the particles and an anhydrous liquid is fed in via the particle feed line.

In particular, the liquid has a proportion of at most 25% by weight, preferably from 4 to 15% by weight, especially preferably at least 2% by weight of the mixture.

In particular, the liquid comprises a component of a carbonate-based electrolyte or a paraffin-based oil. In particular, the liquid comprises a component of a carbonate-based electrolyte, e.g., ethylene carbonate ($C_3H_4O_3$) or diethylene carbonate ($C_5H_{10}O_3$), or a paraffin-based oil. If an electrolyte component is used as the liquid, its adhesion to the electrode foil is not harmful, not even for the subsequent operation of the battery cell produced in this manner.

In particular, ethylene carbonate can be supplemented with polypropylene carbonate, so that the liquid does not solidify even at lower temperatures.

In particular, no water is used in the proposed method to produce the mixture, unlike in the known hammering method.

The liquid can be fed to the particles in a mixing device. In particular, the liquid and the particles are mixed and then made available as a so-called "slurry," for example, for feeding to the cutting device. The mixture of particles and liquid can then be fed in via the particle feed line.

Aluminum oxide and/or silicon carbide and/or sodium bicarbonate in particular are used as the particle. Other materials can also be used. The selection of the particles depends on the removal rate, the type of work material, and the processing accuracy. Aluminum oxide is preferably used for electrode foils. Aluminum oxide is ceramic, is not electrically conductive, and may be present in the battery cell, for example as a coating of the separator. In addition, it has a high hardness and a high electrical resistance.

In particular, the particles have a maximum diameter of 50 microns. A quality of the cut edges produced by the cutting can be increased by smaller particles. The particles preferably have a maximum diameter of 20 to 50 microns.

In particular, the cutting device has a suction device by means of which particles that have at least passed through the electrode foil or are still present on the surface are suctioned off. The suction device can be arranged adjacent to the cutting tool or with separation from the cutting tool through the electrode foil. The suction device can thus be arranged so as to be at least situated opposite the cutting tool, with the electrode foil being arranged in between. The particles passing through the electrode foil can then be suctioned off.

In particular, the electrode foil is guided over tension rollers and/or conveyor rollers, thereby defining the position of the electrode foil relative to the cutting device. In particular, the cutting lines extend in such a way that there is no support from a roller in this region.

The rollers can be designed with a surface structure which is such that the electrode foil is tensioned not only in the longitudinal direction (x direction), but also in the width direction (y direction). This voltage transferred to the electrode foil can support the cutting process.

In particular, the electrode foil can be supported by a support device, thus enabling a separation between the cutting tool and the surface in particular to be set precisely. In particular, the suction device can be at least partially integrated in the support device, so that the suction device is situated opposite the cutting tool below the cutting line and particularly at all times during cutting.

In particular, the cutting device comprises a heating device by means of which the electrode foil is dried after step e). In particular, the heating device comprises at least one infrared radiator by means of which the electrode foil can be heated, particularly to 105 to 125 degrees Celsius, preferably to approximately 120 degrees Celsius.

In particular, the liquid of the mixture can be removed from the cut edges using the heating device.

In particular, the cutting device has a cleaning device in which at least one cut edge of the electrode foil is at least mechanically contacted, e.g., by a brush or a roller, or by an ionized second gas stream of adhering particles is cleaned. The possibly statically charged particles can be neutralized by the ionized second gas stream and then easily suctioned off or blown off.

In particular, the particles can be used repeatedly. For this purpose, the particles can be collected and returned, meaning that they can be fed back into the process via the particle feed line.

In particular, the method—i.e., the cutting of the electrode foil—takes place during continuous conveyance of the electrode foil along a direction of conveyance (x direction).

Particularly for the slitting (cutting line extends along the extension, x direction, of the continuous material for dividing the wide starting material into a plurality of narrower strips of continuous material), the electrode foil is moved relative to the stationary cutting tool. In particular, the proposed enclosure is not being used here.

For the notching (the collectors are formed from the continuous material with the cutting line; the cutting lines extend longitudinally and transversely to the extension of the continuous material, for instance along the y direction and the x direction), the electrode foil is arranged particularly so as to be stationary relative to the cutting tool. For this purpose, either the cutting tool is moved together with the electrode foil, the conveyance of the electrode foil is stopped, or a compensation mechanism is provided.

For the cutting (the cutting line extends transversely to the extension of the continuous material along the y direction; the electrode foils are cut off from the continuous material by the cutting and the individual layers of the stack are formed), the electrode foil is arranged particularly so as to be stationary relative to the cutting tool. For this purpose, either the cutting tool is moved together with the electrode foil, the conveyance of the electrode foil is stopped, or a compensation mechanism is provided.

For instance, the compensation mechanism can comprise roller systems by means of which the electrode foil is multiply deflected. The deflection points defined by rollers can be moved toward one another so that their distances from one another change. A length of the electrode foil along the direction of conveyance between an electrode foil coil and the cutting device can thus be changed by the compensation mechanism. The electrode foil can thus be unwound continuously from the electrode foil coil and, at the same time, be arranged stationarily opposite the cutting tool.

The proposed enclosure is used particularly for notching and/or cutting.

Rebounding of particles off the surface occurs only to a small extent during cutting. Therefore, the method is economically feasible and safe for an operator. Rebounding can be completely prevented during notching and cutting.

A device for cutting electrode foils that are intended for use in a battery cell is also proposed. The cutting device is designed to be particularly suitable for carrying out the method described herein.

The cutting device comprises at least one cutting tool, one vibration device for exciting at least the cutting tool to vibration, and one particle feed line for supplying at least particles. The cutting tool can be arranged above the electrode foil with separation from a surface of the electrode foil, and the electrode foil can be cut at least as a result of the vibrations of the cutting tool that are transmitted to at least one particle.

In particular, a mixture of at least the particles and an anhydrous liquid is fed in via the particle feed line. The liquid serves particularly to wet the particles. The particles are more closely bound to one another as a result, and rebounding of the particles flung onto the surface can be reduced or prevented.

In particular, the cutting tool is an ultrasonic horn or is arranged on an ultrasonic horn, it being possible for the cutting tool to be excited to vibration by a vibration device of the cutting device. As a result of the vibrations, the cutting tool is moved particularly on a plane that is oriented perpendicular to the surface.

A battery cell is also proposed which comprises at least one housing with a stack of electrode foils arranged therein that are produced particularly by means of the method described herein and/or by the cutting device described herein.

A motor vehicle is also proposed which comprises at least one traction drive with a battery having at least one of the battery cells described herein, it being possible for the traction drive to be supplied with power by the at least one battery cell.

The method can be carried out particularly by a data processing system, e.g., a control unit, the system having means which are suitably equipped, configured, or programmed to perform the steps of the method or which perform the method. With the system, it is possible to at least
- control the particles and/or liquid fed in via the particle feed line;
- control the cutting speed;
- control the vibration device.

The cutting device particularly comprises the system described above.

The means comprise, for example, a processor and a memory in which instructions to be executed by the processor are stored, as well as data lines or transmission devices which enable instructions, measured values, data, or the like to be transmitted between the listed elements.

A computer program is also proposed that comprises instructions which, when the program is executed by a computer, cause the computer to carry out the method described herein or, rather, the steps of the method described herein.

A computer-readable storage medium is also proposed that comprises instructions which, when executed by a computer, cause the computer to carry out the method described herein or, rather, the steps of the method described herein.

Remarks concerning the method can be applied particularly to the cutting device, the battery cell, the motor vehicle, the data processing system, and to the computer-implemented method (i.e., the computer or processor and the computer-readable storage medium), and vice versa.

The following advantages are achieved:
- In particular, the proposed cutting of an electrode foil with particles makes burr-free cutting possible;
- It does not create a heat-affected zone like laser cutting;
- An electrolyte component, e.g., ethylene carbonate (EC), can be used as the liquid for the mixture; that is, even if ethylene carbonate is present on the cut edge after drying, it is not harmful;
- In particular, alumina is suggested as the particle(s); it is not an electrical conductor and therefore does not create a short circuit if particles remain on the cut edge;
- A paraffin-based oil can be used instead of ethylene carbonate, optionally with additives; paraffin oil can be mixed with alcohol for quick evaporation; all of the paraffin-based oil can be vaporized using the heating device;
- A cylindrical ultrasonic horn or an ultrasonic horn having an exponential contour is provided for the slitting; for notching and cutting, a rectangular ultrasonic horn is provided in particular, which particularly has a shape corresponding to the cutting line;
- No particle is able to stick to the cut edge, because the high-velocity gas stream performs edge cleaning; further cleaning of the cut edges and of the surface can be carried out before winding;
- The method can be carried out at a very high cutting speed of approximately 150 m/min;
- Tool wear occurs only on the cutting tool, which is easy to exchange; for this reason, the method is very economical;
- No gas is generated, unlike with laser cutting; as a result, no complex gas extraction is required; there is also no need to cool the electrode foil in order to reduce the heat-affected zone;
- The method can be used both for slitting and for notching and cutting;

A very thin cut edge is produced, because fine particles, e.g., those with a maximum diameter of up to 25 microns, can be used, and the amplitude of the vibration of the tip of the cutting tool can be adjusted to about 50 microns;

Less floor space is required, since cutting, drying, and cleaning can be integrated into a single machine, the cutting device;

The method is economical, because the particles can be reused multiple times;

The ultrasonic horn has the primary function of amplifying the amplitude of the vibration; the ultrasonic horn delivers a large amplitude to the particles, thus enhancing the cutting action of the particles;

The ultrasonic horn is not subject to wear and therefore has a long service life;

The cutting tool can be designed to be wear-resistant and is coupled or connected to the ultrasonic horn; the cutting tool is designed to be exchangeable;

Rebounding of the particles off the surface of the electrode foil hardly occurs, which means that no additional arrangement for catching or suctioning off the rebounded particles is required;

A cylindrical ultrasonic horn with a correspondingly cylindrical or conical cutting tool is used particularly for the slitting.

A rectangular ultrasonic horn with a correspondingly rectangular cutting tool is used particularly for notching and cutting.

Particularly in the claims and in the description that describes them, the indefinite articles ("a" and "an") are to be understood as such and not as quantifiers. Accordingly, terms and components that are introduced therewith are thus to be understood as being present at least singly but particularly also possibly in a plurality.

By way of precaution, it should be noted that the number words used here ("first," "second," . . . ) serve primarily (only) to distinguish a plurality of similar objects, quantities, or processes; that is, they do not prescribe any dependency and/or order of these objects, quantities, or processes relative to one another. Should a dependency and/or order be required, this is explicitly stated herein or it obviously follows for a person skilled in the art when studying the embodiment specifically described. If a component can occur multiple times ("at least one"), the description of one of these components can apply equally to all or a portion of the plurality of these components, but this is not necessarily the case.

BRIEF DESCRIPTION OF THE DRAWINGS

The invention and the technical environment will be explained in greater detail with reference to the enclosed figures. It should be noted that the invention is not intended to be limited by the specified embodiments. In particular, unless explicitly stated otherwise, it is also possible to extract partial aspects of the features explained in the figures and to combine them with other components and insights from the present description. In particular, it should be pointed out that the figures and, in particular, the illustrated proportions are only schematic. In the drawings.

DETAILED DESCRIPTION OF THE INVENTION

Figure 1:
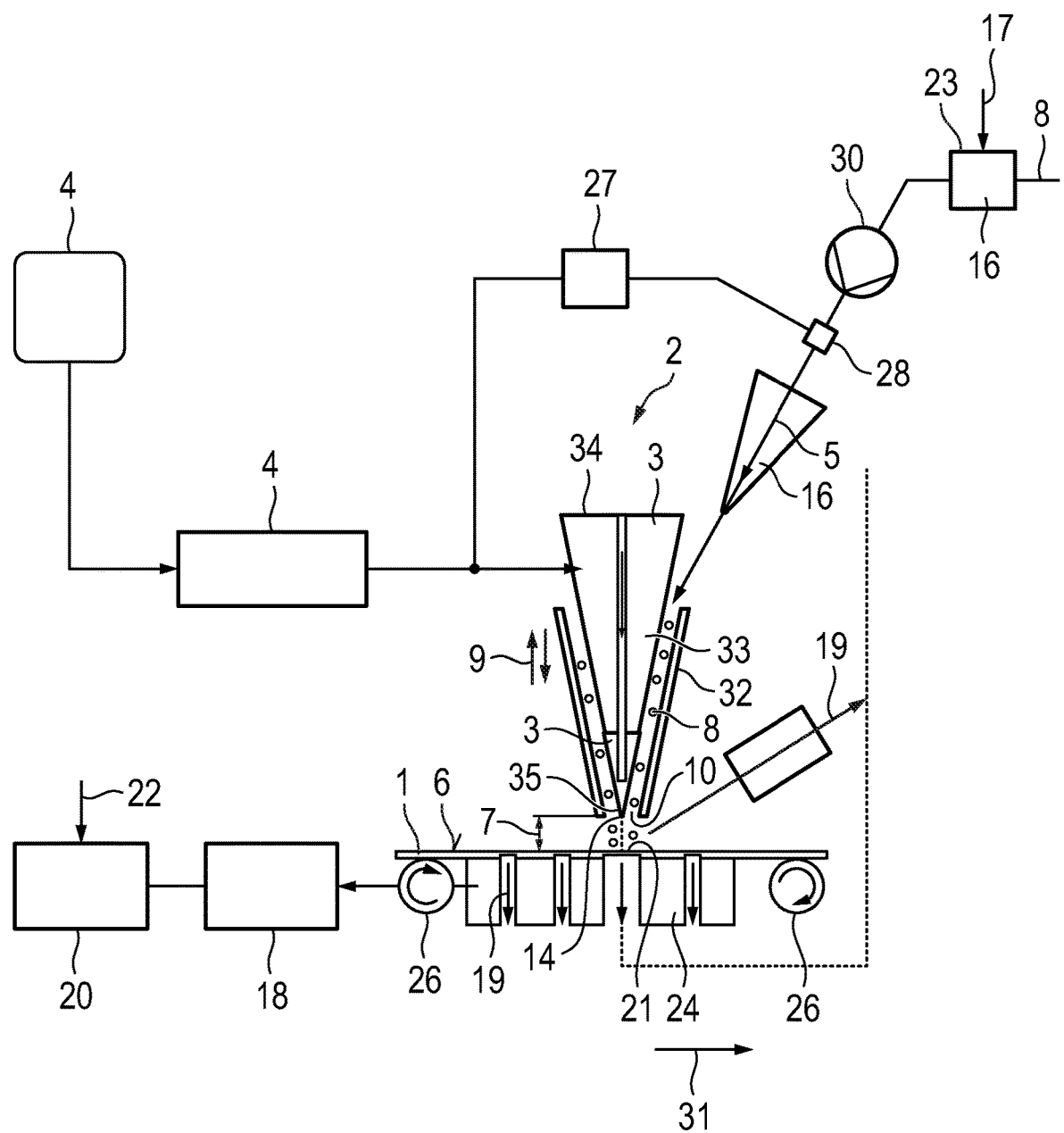
FIG. 1 shows a cutting device for carrying out the method.

FIG. 1 shows a cutting device 2 for carrying out the method. The cutting device 2 comprises a cutting tool 3, a vibration device 4, and a particle feed line 5 for supplying at least particles 8. The cutting tool 3 is arranged above the electrode foil 1 with separation 7 from a surface 6 of the electrode foil 1, and the electrode foil 1 is cut at least as a result of the vibrations 9 of the cutting tool 3 that are transmitted to at least one particle 8.

According to step a), an electrode foil 1 with a surface 3 is provided. The electrode foil 1 is provided as a continuous material. The electrode foil 1 has two largest side surfaces with a theoretically continuous length in an x direction—the direction of conveyance 31 —, a width in a y direction, and a thickness in a z direction. The extension in the z direction is the smallest. In the present case, one of the side surfaces of the electrode foil 1 forms the surface 3.

A cutting device 4 is also provided which comprises a cutting tool 3, a vibration device 4, and a particle feed line 5. Furthermore, the cutting tool 3 is arranged over the electrode foil 1 with separation 7 from the surface 6 (step b)).

According to step c), at least particles 8 are introduced from the particle feed line 5 into the cutting device 2. This particle feed line 5 serves to transport the particles 8 to the cutting device 2, more particularly to the cutting tool 3, more particularly to the surface 6 of the electrode foil 1 that is situated opposite the cutting tool 3. The particle feed line 5 transfers at least the particles 8 to a feeding device 32 that is coupled to the cutting tool 3. At least the particles 8 exit the cutting device 2 via the outlet 10 of the feeding device 32 and flow toward the surface 3.

According to step d), at least the cutting tool 3 is excited by the vibration device 4. As a result of the vibrations 9, at least the cutting tool 3 moves on a plane that is oriented perpendicular to the surface 6. In this case, the feeding device 32 is also excited. It is coupled to the cutting tool 3 for this purpose.

The cutting tool 3 does not contact the surface 6, or does not do so directly. The cutting tool 3 contacts the surface 6 via at least one particle 8 that is interposed between the cutting tool 3 and the surface 6. The cutting tool 3 thus contacts the particle 8 and moves the particle 8 as a result of the vibrations 9. The particle 8 which has been excited in this manner produces the cutting effect 9 on the electrode foil 1. The separation 7 between the cutting tool 3 and the surface 6 can thus be bridged by individual particles 8.

According to step e), the vibrations 9 of the cutting tool 3 are applied to the electrode foil 1 via at least one particle 8 that is interposed between the cutting tool 3 and the electrode foil 1, whereby the electrode foil 1 is cut.

The cutting tool 3 is arranged on an ultrasonic horn 33, which is excited to vibration 9 by the vibration device 4.

The cutting tool 3 and the ultrasonic horn 33 are connected to one another by a slide mechanism. The slide mechanism enables the cutting tool 3 to be exchanged with ease. To do this, the cutting tool 3 is pushed into a receptacle on the ultrasonic horn 33.

Starting from a mixing device 23, a mixture 16 of the particles 8 and an anhydrous liquid 17 is fed in via a pump 30 through the particle feed line 5.

The flow of the mixture 16, more particularly of the liquid 17 and particles 8, is respectively controlled by means of a valve 28.

The cutting device 2 has a suction device 19 by means of which particles 8 rebounding from the surface 6 or remaining on the surface 6 and particles 8 having passed through the electrode foil 1 are suctioned off. The suction device 19 is partially adjacent to the cutting tool 3. Particles 8 rebounding from the surface 6 can thus be suctioned off. In addition, part of the suction device 19 is arranged with separation from the cutting tool 3 through the electrode foil 1. The suction device 19 is thus also arranged so as to be situated opposite the cutting tool 3, with the electrode foil 1 being arranged in between. The particles 8 passing through the electrode foil 1 can then be suctioned off.

The electrode foil 1 is guided over tension rollers 26 and conveyor rollers 26, thereby defining the position of the electrode foil 1 relative to the cutting device 2. The cutting lines extend in such a way that there is no support from a roller 26 in this region.

The electrode foil can be supported by a support device, thus enabling a separation 7 between the cutting tool 3 and the surface 6 to be set 6 precisely. The suction device 19 is at least partially integrated into the support device 24, so that the suction device 19 is situated opposite the cutting tool 3 below the cutting line and at all times during cutting.

The cutting device 2 comprises a heating device 18 by means of which the electrode foil 1 that is acted upon by the particles 8 and the liquid 17 is dried. The liquid 17 of the mixture 16 can be removed from the cut edges 21 using the heating device 18.

The cutting device 2 has a cleaning device 20 in which the cut edges 21 of the electrode foil 1 are cleaned by a mechanical contact, e.g., by a brush or a roller, or by an ionized gas stream 22 of adhering particles 8. The possibly statically charged particles 8 can be neutralized by the ionized gas stream 22 and then suctioned off or blown off more easily.

The particles 8 are used repeatedly. For this purpose, the particles 8 are collected at least via the suction device 19 and returned to a mixing device 23 for the mixture 16 so that they can be fed via the particle feed line 5 back to the feeding device 32.

Certain parts of the cutting device 2 could be controlled via a control unit 27.

Figure 2:
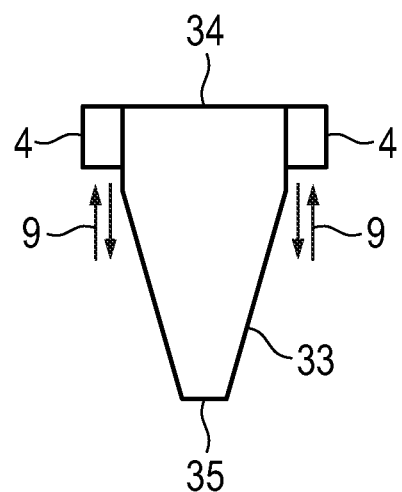
FIG. 2 shows a cutting tool with a first design variant of a vibration device in a side view.

FIG. 2 shows a side view of a cutting tool 3 with a first design variant of a vibrating device 4. Reference is made to the remarks in relation to FIG. 1.

The transducer of the vibration device 4 is embodied in the form of a ring and arranged in the vicinity of a first end 34 of the cutting tool 3 or ultrasonic horn 33. Only the ultrasonic horn 33 is excited via the transducer.

The cutting tool 3 or the ultrasonic horn 33 extends between a first end 34 and a second end 35. The vibrations 9 are introduced at the first end 34. The tip 14 of the cutting tool 3 is arranged at the second end 35.

Figure 3:
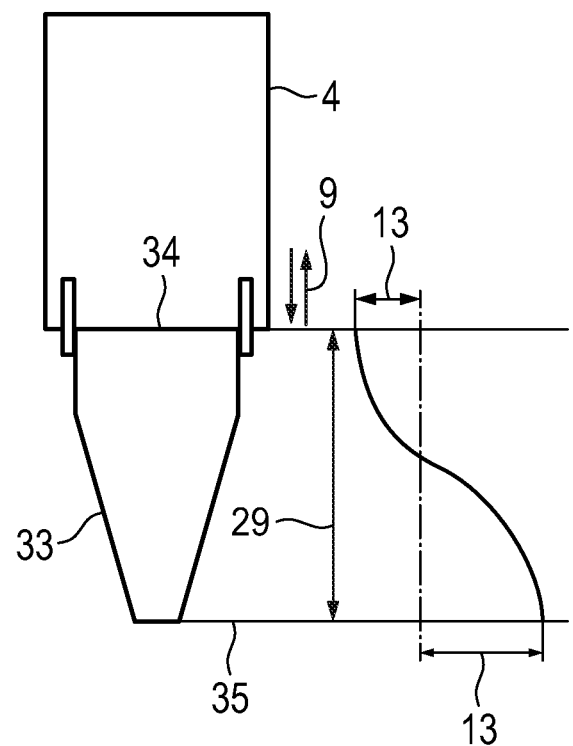
FIG. 3 shows a cutting tool with a second design variant of a vibration device in a side view.

FIG. 3 shows a cutting tool 3 with a second design variant of a vibrating device 4 in a side view. Reference is made to the remarks in relation to FIG. 2.

The transducer of the vibration device 4 is embodied in the form of a cylinder that is connected to the first end 34 of the cutting tool 3 or ultrasonic horn 33.

The calculation of the length 29 of the ultrasonic horn 33, i.e., of the extension between the first end 34 and the second end 35 of the cutting tool 3, is one of the most important aspects of the ultrasonic horn design. The length 29 of the ultrasonic horn 33 up to the tip 14 of the cutting tool 3 should be an odd multiple of half the wavelength of the vibration 9 of the transducer (lambda/2). It should be noted that the amplitude 13 of the vibration 9 is at its maximum at the second end 35. The vibration node, i.e., the smallest amplitude 13, is provided at the first end 34 of the ultrasonic horn 33, and the antinode, i.e., the largest amplitude 13, is provided at the second end 35 or at the tip 14 of the cutting tool 3.

Figure 4:
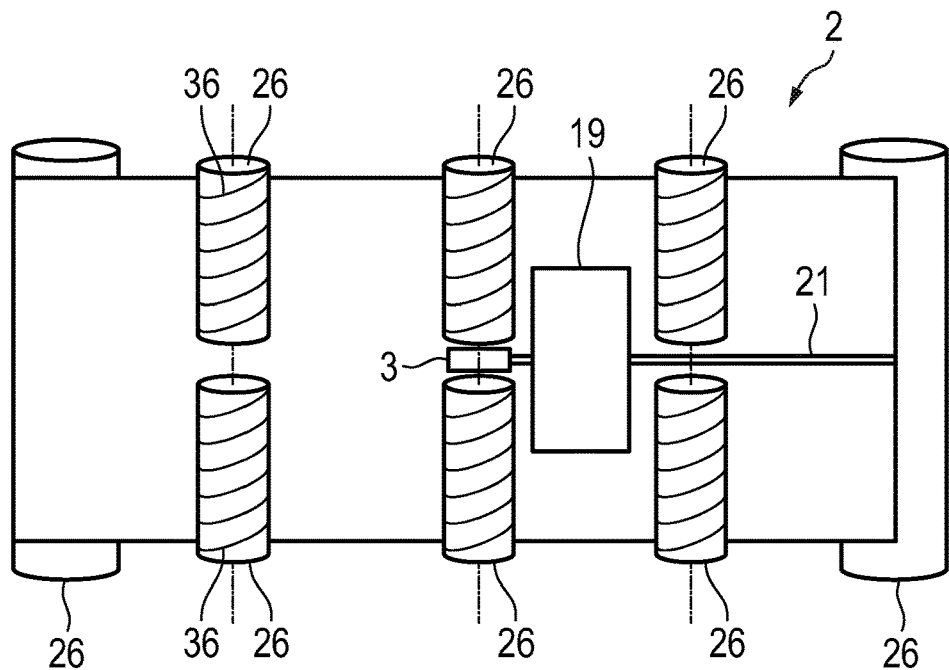
FIG. 4 shows the slitting in a view from above.

FIG. 4 shows the slitting in a view from above. Reference is made to the remarks in relation to FIGS. 1 to 3.

The electrode foil 1 is guided over tension rollers 26 and conveyor rollers 26, thereby defining the position of the electrode foil 1 relative to the cutting device 2. The cutting lines extend in such a way that there is no support from a roller 26 in the region opposite the cutting tool 3.

The conveyor rollers 26 are designed with a surface structure 36 which is such that the electrode foil 1 is tensioned not only in the longitudinal direction (x direction, or direction of conveyance 31) but also in the width direction (y direction). The cut edge 21 is produced here by slitting, i.e., along the x direction.

Figure 5:
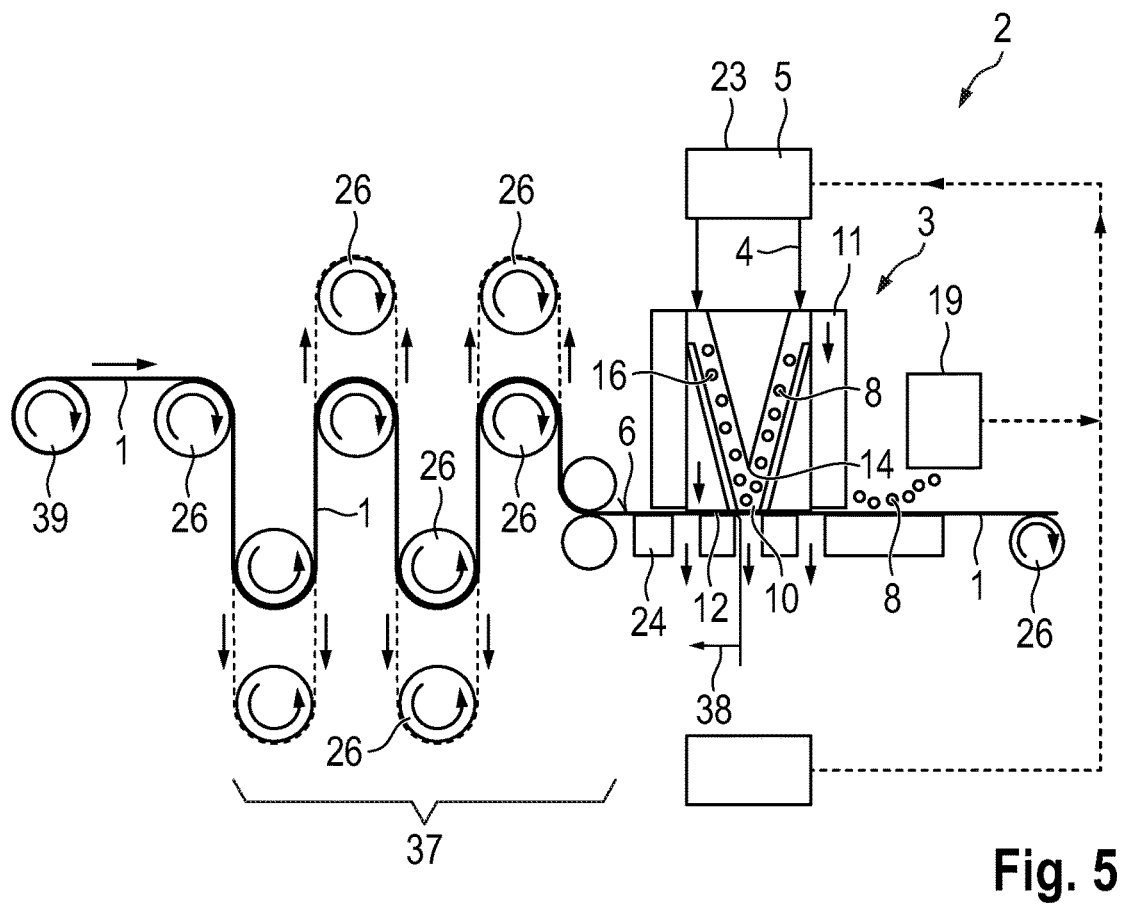
FIG. 5 shows a cutting device at least for notching and cutting.
Figure 6:
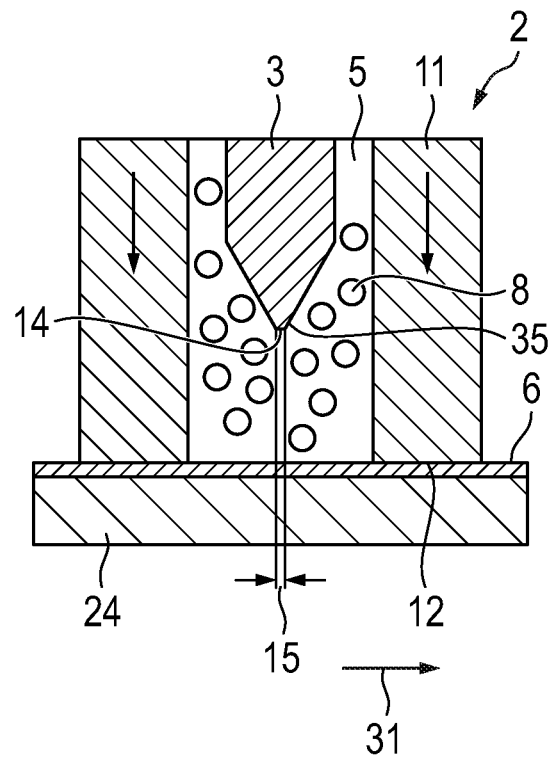
FIG. 6 shows step c) of the method.
Figure 7:
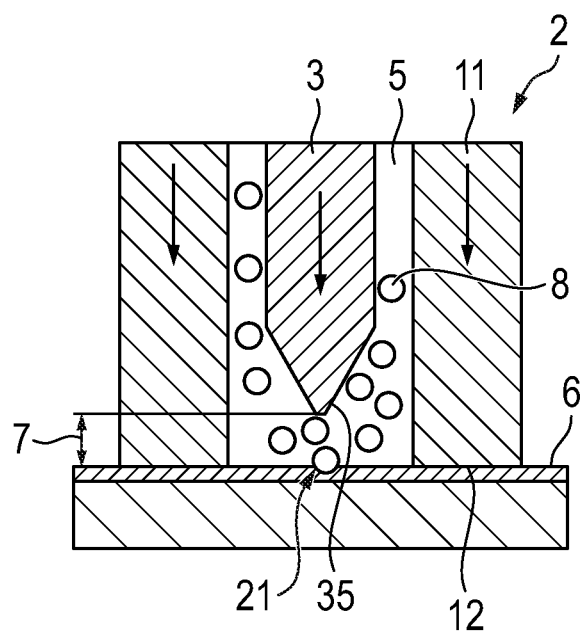
FIG. 7 shows step e) of the method.

FIG. 5 shows a cutting device 2 at least for notching and cutting. FIG. 6 shows step c) of the method. FIG. 7 shows step e) of the method. FIGS. 5 to 7 are described together below. Reference is made to the remarks in relation to FIGS. 1 to 3.

For the notching (the collectors are formed from the continuous material with the cutting line; the cutting lines extend longitudinally and transversely to the extension of the continuous material, for instance along the y direction and the x direction), the electrode foil 1 is arranged so as to be stationary relative to the cutting tool 3. A compensation mechanism 37 is provided for this purpose.

For the cutting (the cutting line extends transversely to the extension of the continuous material along the y direction; the electrode foils 1 are cut off from the continuous material by the cutting and the individual layers of the stack are formed), the electrode foil 1 is arranged so as to be stationary relative to the cutting tool 3. The compensation mechanism 37 is provided for this purpose.

The compensation mechanism 37 comprises a roller system 12 by means of whose rollers 26 the electrode foil 1 is multiply deflected. The deflection points defined by rollers 26 can be moved toward one another, so that their distances 38 from one another change. A length of the electrode foil 1 along the direction of conveyance 31 between an electrode foil coil 39 and the cutting device 2 can thus be changed by the compensation mechanism 37. The electrode foil 1 can thus be unwound continuously from the electrode foil coil 39 and, at the same time, be arranged stationarily opposite the cutting tool 3.

An enclosure 11 is used for notching and/or cutting. The enclosure 11 is arranged on the surface 6 before step c). In step c), at least the particles 8 are introduced into the enclosure 11. The enclosure 11 ensures that the particles 8 that are fed in remain in the vicinity of the cutting tool 3. The region around the cutting tool 3 defined by the enclosure 11 is designed to be as small as possible, so that the quantity of particles 8 supplied can be limited. The enclosure 11 is arranged at a distance from the cutting tool 3, so that the vibrations 9 of the cutting tool 3 are not limited or dampened by the enclosure 11.

An end face 12 of the enclosure 11 which contacts the surface 6 is designed to be elastically deformable. The enclosure 11 can thus be arranged on the surface 6, and a gap between the end face 12 and the surface 6 can be sealed.

Figure 8:
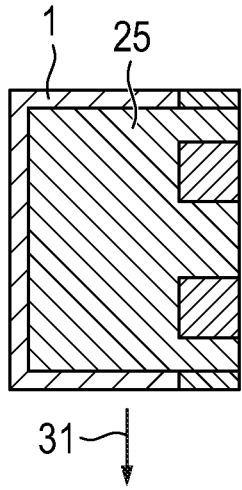
FIG. 8 shows step a) of a method for notching and cutting.

FIG. 8 shows step a) of a method for notching and cutting. Here the electrode foil 1 is provided as continuous material and transported along a direction of conveyance 31. Conveyance is discontinued for the purpose of notching, e.g., by the compensation mechanism 37 described. A clamping device 25 fixes the electrode foil 1 in its position relative to the stationary cutting tool 3. The cutting lines or the cutting region is accessible for the cutting tool 3.

Figure 9:
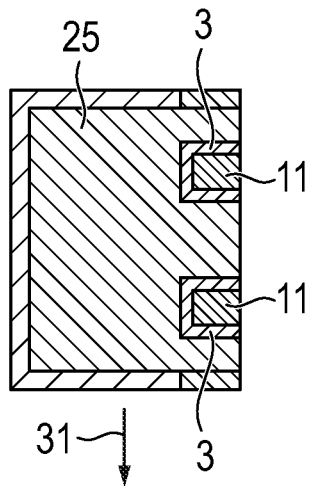
FIG. 9 shows steps b) to e) of the method for notching.

FIG. 9 shows steps b) to e) of the method for notching. Reference is made to the remarks in relation to FIG. 8. The enclosure 11 is arranged on the electrode foil 1. The particles 8 are introduced horizontally into the enclosure 11. The cutting tool 3 is excited, and the cutting lines are generated. The cutting tool 3 has a shape that is based on the cutting line (here U-shaped).

Figure 10:
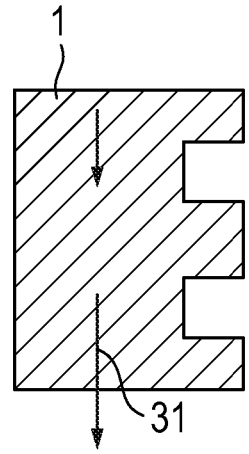
FIG. 10 shows step a) of the method for cutting.

FIG. 10 shows step a) of the method for cutting. The electrode foil 1 has the notches produced according to FIG. 9. Reference is made to the remarks in relation to FIG. 9. The electrode foil 1 is conveyed to the next cutting device 2.

Figure 11:
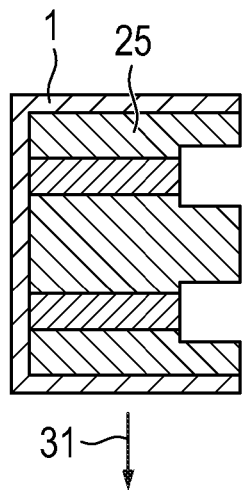
FIG. 11 shows before step b) of the method for cutting.

FIG. 11 shows the state before step b) of the method for cutting. Reference is made to the remarks concerning the previous state according to FIG. 10. The electrode foil 1 is again fixed using a clamping device 25. The cutting lines or the cutting region is accessible for the cutting tool 3.

Figure 12:
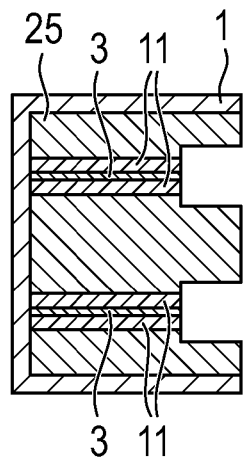
FIG. 12 shows steps b) to e) of the method for cutting.

FIG. 12 shows steps b) to e) of the method for cutting. The enclosure 11 is arranged on the electrode foil 1. The particles 8 are introduced horizontally into the enclosure 11. The cutting tool 3 is excited, and the cutting lines are generated. The cutting tool 3 has a rectangular shape.

LIST OF REFERENCE SYMBOLS

1 electrode foil
2 cutting device
3 cutting tool
4 vibration device
5 particle feed
6 surface
7 separation
8 particles
9 vibration
10 outlet
11 enclosure
12 end face
13 amplitude
14 tip
15 width
16 mixture
17 liquid
18 heating device
19 suction device
20 cleaning device
21 cut edge
22 gas stream
23 mixing device
24 support device
25 clamping device
26 rollers
27 control unit
28 valve
29 length
30 pump
31 direction of conveyance
32 feeding device
33 ultrasonic horn
34 first end
35 second end
36 surface structure
37 compensation mechanism
38 distance
39 electrode foil coil

The invention claimed is:

1. A method for cutting electrode foils that are intended for use in a battery cell, wherein the method is carried out with a cutting device that comprises a cutting tool, a vibration device, and a particle feed line, and comprises the following steps:
   a) providing an electrode foil with a surface;
   b) arranging the cutting tool over the electrode foil with a separation from the surface;
   c) introducing particles from the particle feed line into the cutting device;
   d) exciting the cutting tool to vibration by means of the vibration device; and
   e) applying the vibrations of the cutting tool to the electrode foil via at least one particle that is interposed between the cutting tool and the electrode foil, whereby the electrode foil is cut.

2. The method as set forth in claim 1, wherein the step of exciting the cutting tool to vibration by means of the vibration device comprises arranging the cutting tool on an ultrasonic horn and exciting the ultrasomic horn by the vibration device.

3. The method as set forth in claim 1, further comprising coupling an outlet of the particle feed line to the cutting tool.

4. The method as set forth in claim 1, further comprising arranging an enclosure of the cutting device on the surface before step c); and
   introducing the particles into the enclosure in step c).

5. The method as set forth in claim 4, further comprising providing the enclosure with at least one end face of the enclosure which contacts the surface and is elastically deformable.

6. The method as set forth in claim 1, wherein the step of exciting the cutting tool to vibration comprises vibrating the cutting tool at an amplitude of at most 80 micrometers or at a frequency of between 5 kHz and 50 kHz.

7. The method as set forth in claim 1, further comprising providing the cutting tool with tip facing toward the electrode foil with a smallest width of 0.2 to 1.5 millimeters.

8. The method as set forth in claim 1, wherein the step of introducing particles from the particle feed line into the cutting device comprises feeding a mixture of at least the particles and an anhydrous liquid via the particle feed line.

9. The method as set forth in claim 8, wherein the anhydrous liquid in the mixture has a proportion of at most 25% by weight of the mixture.

10. The method as set forth in claim 8, wherein the anhydrous liquid in the mixture has a component of a carbonate-based electrolyte or paraffin-based oil.

11. The method as set forth in claim 1, further comprising providing the cutting device to comprise a heating device by means of which the electrode foil is dried after step e).

12. A device for cutting electrode foils that are intended for use in a battery cell, comprising:

a cutting tool, wherein the cutting tool is positioned above the electrode foil with a separation from a surface of the electrode foil, a particle feed line for supplying particles to the cutting tool or to the surface of the electrode foil positioned opposite of the cutting tool, and a vibration device for exciting the cutting tool to vibration, wherein the device is configured to cut the electrode foil as a result of the vibrations of the cutting tool that are transmitted to at least one particle that is interposed between the cutting tool and the electrode foil.

13. A method for cutting electrode foils that are intended for use in a battery cell, wherein the method is carried out with a cutting device that comprises a cutting tool, a vibration device, and a particle feed line, and comprises the following steps:

a) providing an electrode foil with a surface;
b) arranging the cutting tool over the electrode foil with a separation from the surface;
c) introducing particles from the particle feed line to the cutting tool or to the surface of the electrode foil positioned opposite of the cutting tool;
d) exciting the cutting tool to vibration by means of the vibration device; and
e) applying the vibrations of the cutting tool to the electrode foil via at least one particle that is interposed between the cutting tool and the electrode foil, whereby the electrode foil is cut.

* * * * *